(12) United States Patent
Li et al.

(10) Patent No.: US 11,807,415 B2
(45) Date of Patent: Nov. 7, 2023

(54) SUPPORT UNIT AND FLOOR PLATE

(71) Applicants: Haiwei Li, Guangdong (CN); Yipeng Zhang, Guangdong (CN)

(72) Inventors: Haiwei Li, Guangdong (CN); Yipeng Zhang, Guangdong (CN)

(*) Notice: Subject to any disclaimer, the term of this patent is extended or adjusted under 35 U.S.C. 154(b) by 90 days.

(21) Appl. No.: 17/610,627

(22) PCT Filed: Sep. 28, 2021

(86) PCT No.: PCT/CN2021/121130
§ 371 (c)(1),
(2) Date: Nov. 11, 2021

(87) PCT Pub. No.: WO2022/242009
PCT Pub. Date: Nov. 24, 2022

(65) Prior Publication Data
US 2023/0070499 A1 Mar. 9, 2023

(30) Foreign Application Priority Data

May 19, 2021 (CN) .......................... 202110545344.0
May 19, 2021 (CN) .......................... 202110545555.4
(Continued)

(51) Int. Cl.
*B65D 19/00* (2006.01)
*B65D 19/40* (2006.01)

(52) U.S. Cl.
CPC ......... *B65D 19/0004* (2013.01); *B65D 19/40* (2013.01); *B65D 2519/00024* (2013.01);
(Continued)

(58) Field of Classification Search
CPC ................ B65D 19/0004; B65D 19/40; B65D 2519/00024; B65D 2519/00293; B65D 2519/00308; B65D 2519/00338
(Continued)

(56) References Cited

U.S. PATENT DOCUMENTS 3,393,647 A * 7/1968 Howell ................... B65D 19/40
108/57.1
3,696,761 A * 10/1972 Brown ................... B65D 19/38
108/56.1
(Continued)

FOREIGN PATENT DOCUMENTS

CN 201687084 U 12/2010
CN 203334535 U 12/2013
(Continued)

OTHER PUBLICATIONS

Chinese Office Action in CN Application No. 110140538, dated Oct. 7, 2022 (10 pages).
(Continued)

*Primary Examiner* — Jose V Chen
(74) *Attorney, Agent, or Firm* — Leason Ellis LLP

(57) ABSTRACT

Disclosed are a support unit and a floor plate. The support unit includes a first plate and a second plate which are spaced apart from each other, one end of the first plate is provided with a plurality of first ring walls at intervals, one end of second plate facing the first plate is provided with a plurality of second ring walls at intervals, the plurality of second ring walls are arranged corresponding to the plurality of first ring walls, each of the second ring walls is sleeved outside and matched with a respective one of the first ring walls to form a support structure that supports the first plate and the second plate.

18 Claims, 9 Drawing Sheets

(30) Foreign Application Priority Data

Jul. 7, 2021 (CN) .......................... 202110769522.8
Jul. 7, 2021 (CN) .......................... 202110770530.4

(52) U.S. Cl.
CPC .............. *B65D 2519/00293* (2013.01); *B65D 2519/00308* (2013.01); *B65D 2519/00338* (2013.01)

(58) Field of Classification Search
USPC ..................... 108/56.3, 51.11, 57.3, 57.32
See application file for complete search history.

(56) References Cited

U.S. PATENT DOCUMENTS

| | | | | |
|---|---|---|---|---|
| 3,804,032 | A | * | 4/1974 | Baucom ................. B65D 19/40 |
| | | | | 108/56.3 |
| 5,492,069 | A | * | 2/1996 | Alexander ......... B65D 19/0069 |
| | | | | 108/901 |
| 5,830,299 | A | * | 11/1998 | Teixidor Casanovas .................... |
| | | | | B65D 19/0002 |
| | | | | 156/70 |
| D941,550 | S | * | 1/2022 | Li ................................. D34/38 |
| 2017/0107011 | A1 | * | 4/2017 | Melland ............... B65D 19/385 |

FOREIGN PATENT DOCUMENTS

| | | |
|---|---|---|
| CN | 203727819 U | 7/2014 |
| CN | 204015757 U | 12/2014 |
| CN | 205498176 U | 8/2016 |
| CN | 110949828 A | 4/2020 |
| CN | 212290849 U | 1/2021 |
| KR | 100983828 B1 | 9/2010 |
| WO | WO-2009096629 A1 * | 8/2009 ......... B65D 19/0051 |

OTHER PUBLICATIONS

International Search Report and Written Opinion in PCT/CN2021/121130, dated Jan. 25, 2022 (12 pages) an English translation is attached hereto.

* cited by examiner

SUPPORT UNIT AND FLOOR PLATE

CROSS-REFERENCE TO RELATED APPLICATIONS

This application is a national stage filing under 35 U.S.C. § 371 of international application number PCT/CN2021/121130, filed Sep. 28, 2021, which claims priority to Chinese patent application No. 2021107695228 filed Jul. 7, 2021, Chinese patent application No. 2021107705304 filed Jul. 7, 2021, Chinese patent application No. 2021105453440 filed May 19, 2021, and Chinese patent application No. 2021105455554 filed May 19, 2021. The contents of these applications are incorporated herein by reference in their entirety.

TECHNICAL FIELD

The disclosure relates to the field of floor plate technologies, and more particularly, to a support unit and a floor plate.

BACKGROUND

Floor plates, also known as pallets, are used to carry materials or products, and are widely used as support structures for logistics and transportation. In the related art, floor plates are generally made of plastic or wood materials. However, the plastic floor plates are easily damaged by forklift collision, and have limited load capacities. The wooden floor plates are easy to absorb moisture and become moldy, and can only be used after fumigation, which leads to high use cost. Moreover, the wooden floor plates have insufficient strength and are easy to be damaged.

SUMMARY

The disclosure aims at solving at least one of the technical problems in the prior art. Therefore, the disclosure provides a support unit which has high structural strength, strong bearing capacity and light weight.

The disclosure further provides a floor plate having the above-mentioned support unit.

The disclosure further provides a shelf having the above-mentioned support unit.

The disclosure further provides a fence having the above-mentioned support unit.

A support unit according to an embodiment of a first aspect of the disclosure includes: a first plate, wherein one end of the first plate is provided with a plurality of first ring walls spaced apart from one another; and a second plate spaced apart from the first plate, wherein one end of the second plate facing the first plate is provided with a plurality of second ring walls spaced apart from one another, the plurality of second ring walls extend towards the first plate and are arranged corresponding to the plurality of first ring walls, each of the second ring walls is sleeved outside a respective one of the first ring walls and matched with the first ring wall to form a support structure for supporting the first plate and the second plate.

The support unit according to the embodiment of the disclosure at least has the following beneficial effects.

By arranging the first plate and the second plate spaced apart from each other, the plurality of first ring walls arranged on the first plate are correspondingly sleeved outside the plurality of second ring walls arranged on the second plate, and the first ring walls and the second ring walls are matched and connected, so that the first plate and the second plate are firmly connected, and the connection stability of the first plate and the second plate is improved; the first ring walls and the second ring walls are connected to form the support structures that support the first plate and the second plate, and the support structures are arranged at intervals between the first plate and the second plate, and can be combined with the first plate and the second plate to form the stable support unit, so that the support unit has the advantages of high structural strength and strong bearing capacity. Cavities are formed between the first plate and the second plate and in the support structures, which can effectively reduce a weight of the support unit while ensuring the structural strength of the support unit According to some embodiments of the disclosure, each of the first ring walls is formed by deforming the first plate towards the second plate, and one end of the first ring wall far away from the first plate extends across the second plate.

According to some embodiments of the disclosure, an inner diameter of a cross section of at least a part of the first ring wall gradually increases in a direction far away from the first plate.

According to some embodiments of the disclosure, a longitudinal section of the first ring wall is inclined relative to an axis of the first ring wall by an angle ranging from 1 degree to 3 degrees.

According to some embodiments of the disclosure, the first ring wall forms a through groove with a cross-sectional profile of a circle, a triangle, a quadrilateral or a hexagon.

According to some embodiments of the disclosure, the cross-sectional profile of the through groove is a circle, an inner diameter of the through groove ranges from 35 mm to 45 mm, and a distance between axes of adjacent through grooves ranges from 40 mm to 60 mm According to some embodiments of the disclosure, one end of the first ring wall far away from the first plate extends outwards to form a first edge, and the first edge is attached to the second plate.

According to some embodiments of the disclosure, a second guide edge is provided at a joint between the second plate and the second ring wall, the second guide edge is formed with a clamping groove, and the first edge is clamped in the clamping groove.

According to some embodiments of the disclosure, a lowest position of the first edge is located in a plane of the second plate.

According to some embodiments of the disclosure, the first plate is made of metal, and the first ring walls are formed by stamping the first plate.

According to some embodiments of the disclosure, one end of the second ring wall far away from the second plate extends outwards to form a second edge, and the second edge is attached to the first plate.

According to some embodiments of the disclosure, a first guide edge is provided at a joint between the first plate and the first ring wall, and the second edge is attached to the first guide edge.

According to some embodiments of the disclosure, a longitudinal section of the first guide edge is an arc, and a longitudinal section of the second edge is an arc matched with the first guide edge.

According to some embodiments of the disclosure, the second plate is made of metal, and the second ring walls are formed by stamping the second plate.

According to some embodiments of the disclosure, the first plate and the second plate are made of metal, a periphery of the first plate is provided with a first folded edge, a periphery of the second plate is provided with a second folded edge, and the first folded edge is fixedly connected to the second folded edge.

According to some embodiments of the disclosure, a cavity is formed between the first plate and the second plate, and a depth of the cavity ranges from 12 mm to 20 mm.

A floor plate according to an embodiment of a second aspect of the disclosure includes the support unit according to the above embodiments.

According to some embodiments of the disclosure, the support unit forms a carrier with a support leg at a bottom of the carrier.

According to some embodiments of the disclosure, the first plate is provided with a third through hole and a third ring wall, the third ring wall is arranged at a periphery of the third through hole, the third ring wall extends towards the second plate and abuts against the second plate; the second plate is provided with a fourth through hole and a fourth ring wall, and the fourth ring wall is arranged at a periphery of the fourth through hole and extends in a direction far away from the first plate; and the support leg is a hollow cone structure with an open upper end, the support leg is sleeved on the fourth ring wall, and an outer diameter of the support leg gradually decreases in a direction far away from the carrier; wherein, the third through hole has a diameter smaller than a diameter of the fourth through hole.

According to some embodiments of the disclosure, the support leg includes a bottom wall and a peripheral wall, one end of the peripheral wall is connected to the bottom wall and the other end of the peripheral wall is connected to an outer side of the fourth ring wall, and the bottom wall is provided with a fifth through hole.

According to some embodiments of the disclosure, one end of the peripheral wall far away from the bottom wall is provided with a mounting edge, and the mounting edge abuts against the second plate.

A shelf according to an embodiment of a third aspect of the disclosure includes a support plate, and the support plate includes the support unit according to the above embodiments.

A fence according to an embodiment of a fourth aspect of the disclosure includes a guardrail plate, and the guardrail plate includes the support unit according to the above embodiments.

A method for manufacturing a floor plate according to an embodiment of a fifth aspect of the disclosure includes: providing a first plate; machining a plurality of first through holes which are spaced apart from one another along a length direction and a width direction of the first plate; forming a plurality of hollow cylindrical first ring walls by pressing at positions of the plurality of first through holes respectively; providing a second plate; machining a plurality of second through holes which are spaced apart from one another along a length direction and a width direction of the second plate; forming a plurality of hollow cylindrical second ring walls by pressing at positions of the plurality of second through holes respectively; placing the first plate and the second plate in mirror symmetry, and aligning each of the first ring walls with a respective one of the second ring walls; joining the first plate and the second plate, so that each of the second ring walls is sleeved outside a respective one of the first ring walls and is in press fit with the first ring wall; providing a support leg; and fixedly connecting the support leg to the second plate.

The method for manufacturing the floor plate according to the embodiment of the disclosure at least has the following beneficial effects.

By machining the first ring walls from the first plate and machining the second ring walls from the second plate, and jointing the first plate and the second plate in mirror symmetry, the second ring walls are sleeved outside the first ring walls and tightly matched with the first ring walls, so that the first ring walls and the second ring walls form the support structures that support the floor plate, thus realizing the machining of the metal floor plate. The method has simple machining procedure, and reduces the production cost. Meanwhile, the produced floor plate has high structural strength, strong bearing capacity and long service life.

According to some embodiments of the disclosure, after the step of joining the first plate and the second plate, so that each of the second ring walls is sleeved outside a respective one of the first ring walls and is in press fit with the first ring wall, the method includes: extruding at least a part of the first ring wall outwards, so that an inner diameter of a cross section of the first ring wall gradually increases in a direction far away from the first plate.

Part of the additional aspects and advantages of the disclosure will be given in part in the following description, and will become apparent in part from the following description, or will be learned through the practice of the disclosure.

BRIEF DESCRIPTION OF DRAWINGS

The disclosure will be further explained with reference to the accompanying drawings and embodiments hereinafter, wherein.

DETAILED DESCRIPTION

Figure 1:
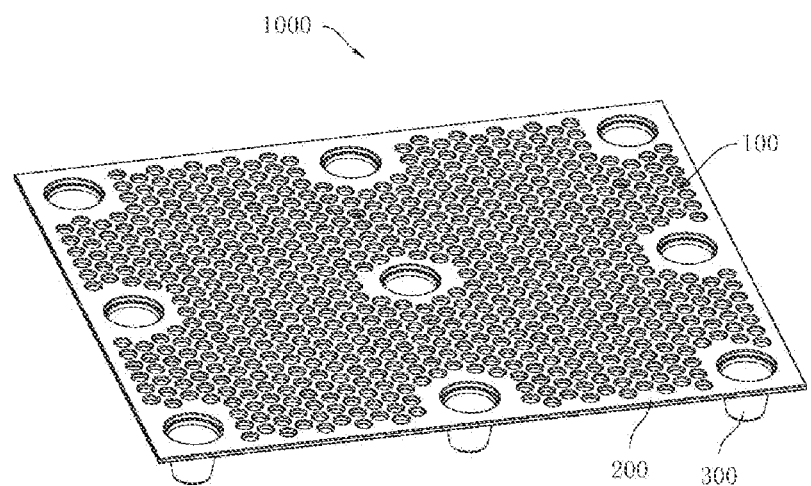
FIG. 1 is a schematic structure diagram of a floor plate according to an embodiment of the disclosure.

The embodiments of the disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the disclosure, but should not be construed as limiting the disclosure.

In the description of the disclosure, it should be understood that the orientation or positional relationship indicated by the terms "upper", "lower", and the like is based on the orientation or positional relationship shown in the drawings, only for the convenience of describing the disclosure and simplifying the description, and does not indicate or imply that the indicated device or element must have a specific orientation, or be constructed and operated in a specific orientation. Therefore, the terms should not be construed as limiting the disclosure.

In the description of the disclosure, a plurality of means two or more. If there is a description to the terms such as first, second, it is only for the purpose of distinguishing technical features, and shall not be understood as indicating or implying relative importance, implicitly indicating the number of the indicated technical features or implicitly indicating the order of the indicated technical features.

In the description of the disclosure, unless otherwise clearly defined, words such as setting, installation, connection, etc., shall be understood broadly, and those having ordinary skills in the art can reasonably determine the specific meanings of the above words in the disclosure in combination with the specific contents of the technical solution.

With reference to FIG. 1, a floor plate 1000 according to an embodiment of the disclosure includes a carrier 200 for bearing goods, and the carrier 200 is formed by combining a plurality of support units 100. The floor plate 1000 of this embodiment implements load-bearing through the support units 100, has strong load-bearing capacity and can be circulated and used in a plurality of links of logistics and transportation.

Figure 2:
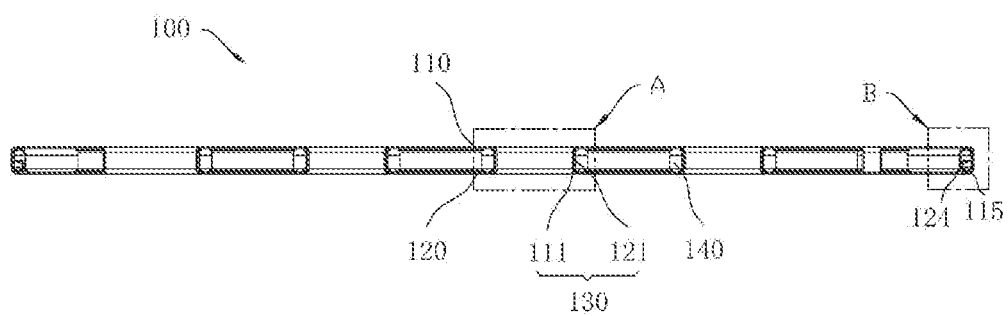
FIG. 2 is a sectional view of the support unit according to an embodiment of the disclosure.
Figure 3:
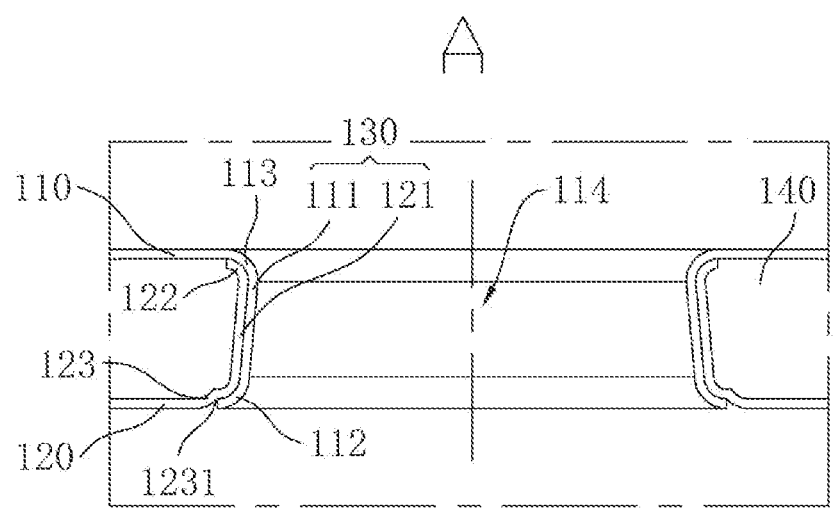
FIG. 3 is an enlarged view of portion A in FIG. 2.

Referring to FIG. 2 and FIG. 3, the support unit 100 according to an embodiment of the disclosure may be used on plate structures such as floor plates and boxes for bearing loads. The support unit 100 of this embodiment includes a first plate 110 and a second plate 120 spaced apart from the first plate 110. The first plate 110 and the second plate 120 may be made of metal materials, such as sheet metal parts. The first plate 110 and the second plate 120 are machined from sheet metal parts, which make the machining procedure of the support unit 100 simpler, and the manufactured support unit 100 has the characteristics of high structural strength and light weight. It may be understood that the first plate 110 and the second plate 120 may also be made of other metal sheet materials. The first plate 110 and the second plate 120 are made of metal, which is convenient for recycling, environmental protection and resource saving.

It may be understood that both the first plate 110 and the second plate 120 are made of galvanized sheet or electrolytic sheet, because the galvanized sheet and the electrolytic sheet have multiple characteristics such as high strength, high ductility, corrosion resistance, nuclear radiation resistance, efficient ultraviolet reflection, easy machining, light weight, being recyclable and pest-free, and low carbon and environmental protection.

Referring to FIG. 1, for example, when the support unit 100 is used for manufacturing floor plates, the support unit 100 is made of galvanized sheet or electrolytic sheet to make the floor plate, which fully meets the use requirements of the floor plate. Moreover, the floor plate made of galvanized sheet or electrolytic sheet produces very little waste after disassembly, and the recovery rate of the removed floor plate made of galvanized sheet or electrolytic sheet is over 80%, which meets the requirements of the environmental protection efficiency.

Continuously referring to FIG. 2 and FIG. 3, it may be understood that a plurality of first ring walls 111 are respectively arranged at intervals on a lower end face of the first plate 110 along a length direction and a width direction of the first plate 110, and the plurality of first ring walls 111 extend towards the second plate 120, and the first ring walls 111 are hollow cylindrical structures penetrating from top to bottom. A plurality of second ring walls 121 are arranged at intervals on an upper end face of the second plate 120 along a length direction and a width direction of the second plate 120, and the plurality of second ring walls 121 extend towards the first plate 110, and the second ring walls 121 are hollow cylindrical structures penetrating from top to bottom. It should be noted that the lower end face and the upper end face referred to here are only for this specific embodiment, cannot be limited to the absolute positions of lower end face and the upper end face, but should be understood as the relative positions of the lower end face and the upper end face. For example, the lower end face of the first plate 110 is an end face of the first plate 110 facing towards one end of the second plate 120, and the upper end face of the second plate 120 is an end face of the second plate 120 facing towards one end of the first plate 110.

The plurality of second ring walls 121 are arranged in one-to-one correspondence with the plurality of first ring walls 111. The second ring walls 121 are sleeved outside the first ring walls 111. The second ring walls 121 and the first ring walls 111 may be connected in a press fit, so that the first ring walls 111 and the second ring walls 121 are attached to form a stable support structure 130. The support structure 130 is used for supporting the first plate 110 and the second plate 120. It should be noted that the connection in press fit may be understood as a connection mode in which no relative movement occurs between the first ring wall 111 and the second ring wall 121. The first ring wall 111 and the second ring wall 121 may be connected in interference fit or transition fit, and may also be completely or partially attached. The first ring wall 111 and the second ring wall 121 may be connected in press fit by extrusion deformation, which is not specifically limited here.

The plurality of support structures 130 are hollow cylindrical structures. Moreover, the support structures 130 are arranged between the first plate 110 and the second plate 120 at intervals, the plurality of support structures 130 support the first plate 110 and the second plate 120, and can be combined with the first plate 110 and the second plate 120 to form the stable support unit 100. Furthermore, the support structure 130 formed by the cooperation of the first ring wall 111 and the second ring wall 121 has high rigidity and is not easy to be squeezed and deformed, which can effectively avoid bending or twisting between the first plate 110 and the second plate 120, so that the structural strength of the support unit 100 is improved. The support unit 100 bears the load on the first plate 110 or the second plate 120 through the support structures 130, and distributes the load to the plurality of support structures 130, so that the bearing capacity of the support unit 100 is improved.

Moreover, the first ring wall 111 and the second ring wall 121 are connected in press fit, so that the connection between the first plate 110 and the second plate 120 is more secure, and the connection stability between the first plate 110 and the second plate 120 is improved.

In addition, the support structures 130 are hollow structures, and cavities are formed between the first plate 110 and the second plate 120 and in the support structures 130, which can effectively reduce a weight of the support unit 100 while ensuring the structural strength of the support unit 100, thus making the support unit 100 lighter and convenient to transport.

It may be understood that the first ring wall 111 may be formed by stamping the first plate 110, that is, the first ring wall 111 and the first plate 110 form an integrally formed structure. The first ring wall 111 may also be fixedly connected to the first plate 110 by welding, riveting, or the like, which is not specifically limited here. When the first ring wall 111 is formed by stamping the first plate 110, the first plate 110 may be punched and then stamped to form the first ring wall 111, or the first plate 110 may be stamped and then punched to form the first ring wall 111.

Referring to FIG. 3, in some embodiments of the disclosure, an upper end of the second ring wall 121 (i.e., one end away from the second plate 120) extends outwards to form a second edge 122, which may be formed by bending the second ring wall 121 or integrally machining the second plate 120. The second edge 122 is attached to the first plate 110, so that the first ring wall 111 and the second ring wall 121 are more attached, and the connection is more secure, so that the structural strength of the support structure 130 is improved. Furthermore, the second edge 122 can support the first plate 110 and a joint between the first plate 110 and the first ring wall 111, so that the second ring wall 121 can more stably bear the load of the first plate 110, so that the bearing capacity of the support unit 100 is improved. In addition, the second edge 122 may be formed as an arc-shaped chamfer, so that the second edge 122 can play a role of guiding the first ring wall 111 to be internally sleeved to the second ring wall 121 when the first plate 110 and the second plate 120 are joined, so that the first plate 110 and the second plate 120 are joined more smoothly to improve the assembly efficiency.

Referring to FIG. 3, in some embodiments of the disclosure, the joint between the first plate 110 and the first ring wall 111 is provided with a first guide edge 113, and the first guide edge 113 may be integrally machined with the first ring wall 111, so as to optimize the stress concentration at the joint between the first plate 110 and the first ring wall 111. The first guide edge 113 is attached to the second edge 122, so that the first guide edge 113 and the second edge 122 can be connected more stably. The second edge 122 and the first guide edge 113, as well as the first ring wall 111 and the second ring wall 121 together form the support structure 130, which can further improve the structural strength and structural stability of the support structure 130, thereby further improving the bearing capacity of the support unit 100.

Referring to FIG. 3, in some embodiments of the disclosure, a longitudinal section of the first guide edge 113 is an arc, and the first guide edge 113 with arc-shaped structure can improve the connection strength between the first plate 110 and the first ring wall 111, and effectively reduce the stress concentration. It may be understood that the longitudinal section of the first guide edge 113 may be understood as a section formed by cutting the first guide edge 113 with a plane where an axis of the first ring wall 111 locates. A longitudinal section of the second edge 122 is an arc matched with the first guide edge 113. The second edge 122 with arc-shaped structure can improve the connection strength with the second ring wall 121, and effectively reduce the stress concentration. Moreover, the second edge 122 has a better supporting effect on the first plate 110 and the first guide edge 113. It may be understood that the longitudinal section of the second edge 122 may be understood as a section formed by cutting the second edge 122 with a plane where an axis of the second ring wall 121 locates.

Figure 6:
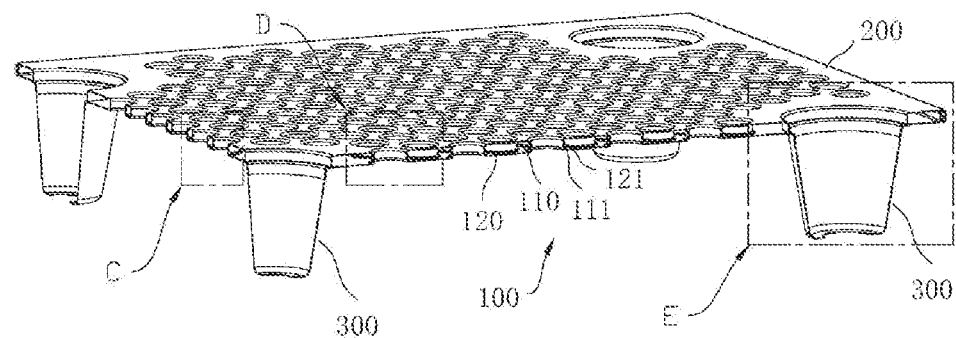
FIG. 6 is a partial sectional view of FIG. 1.
Figure 7:
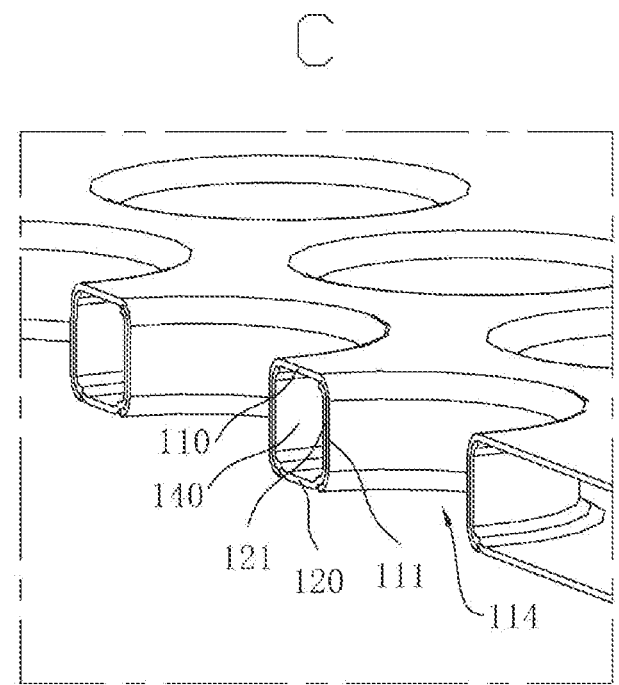
FIG. 7 is an enlarged view of portion C in FIG. 6.
Figure 8:
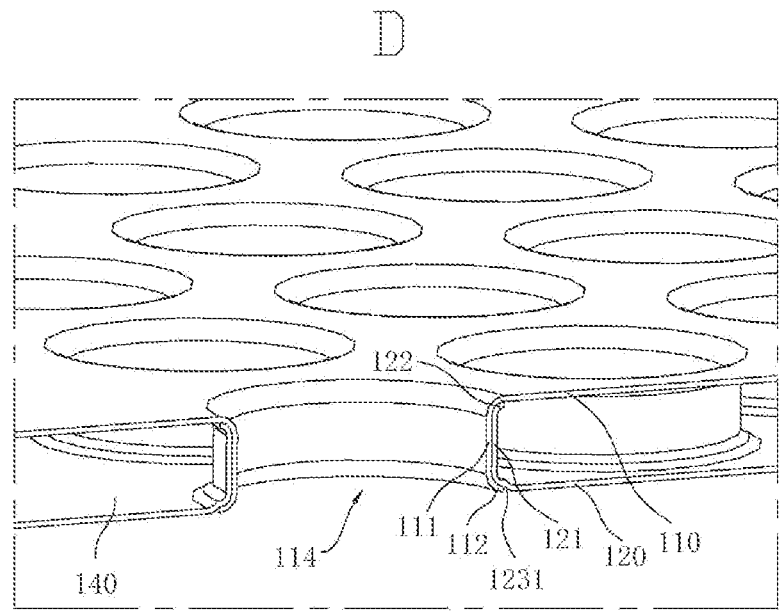
FIG. 8 is an enlarged view of portion D in FIG. 6.

Referring to FIG. 6, FIG. 7 and FIG. 8, in some embodiments of the disclosure, the first ring wall 111 is formed by deforming the first plate 110 towards the second plate 120, for example, the first plate 110 may be deformed by stamping. The deforming method can improve the connection strength between the first ring wall 111 and the first plate 110, thereby improving the structural strength of the first plate 110 and the first ring wall 111, and further improving the bearing capacity of the support unit 100. One end of the first ring wall 111 is connected to the first plate 110, and the other end of the first ring wall 111 extends away from the first plate 110 and extends across the second plate 120. The first ring wall 111 extends across the second plate 120 and forms a through groove 114 extending between the first plate 110 and the second plate 120, so that a plurality of hole sites are formed in the support unit 100. The design of the hole sites can make the support unit 100 have a function of dewatering, so that the support unit 100 may be used in outdoor environments, thus prolonging the service life, facilitating the cleaning of the floor plate 1000, and facilitating the ventilation of goods.

Referring to FIG. 3, it may be understood that an inner diameter of the first ring wall 111 at one end far away from the first plate 110 in this embodiment is larger than an inner diameter of the first ring wall 111 at one end near the first plate 110. That is, in a direction far away from the first plate 110, an inner diameter of a cross section of the first ring wall 111 gradually increases. It should be noted that in order to realize the above structure, the first ring wall 111 may be extruded outwards, for example, by expanding or reaming, which is not specifically limited here. For example, the whole first ring wall 111 may be extruded so that the inner diameter of the cross section of the first ring wall 111 gradually increases from the end connected to the first plate 110 to the end far away from the first plate 110. Alternatively, the end of the first ring wall 111 far away from the first plate 110 is extruded to gradually increase the inner diameter of the cross section of a part of the first ring wall 111. After the first ring wall 111 is extruded, the connection between the first ring wall 111 and the second ring wall 121 can be firmer, and the first ring wall 111 and the second ring wall 121 form a tapered structure, which can prevent the second plate 120 from falling off the first plate 110, thus improving the structural stability of the support unit 100, and making the support unit 100 have higher structural strength and stronger bearing capacity.

Referring to FIG. 3, it may be understood that the longitudinal section of the first ring wall 111 is inclined relative to the axis of the first ring wall 111. The longitudinal section of the first ring wall 111 here may be understood as a section formed by cutting the first ring wall 111 with a plane where the axis of the first ring wall 111 locates. In this embodiment, by inclining the first ring wall 111, the first ring wall 111 and the second ring wall 121 form the tapered structure, which can prevent the second plate 120 from falling off the first plate 110 and further improve the structural stability of the support unit 100. Furthermore, the inclined angle ranges from 1 degree to 3 degrees, and the machining difficulty of the inclined angle within the above parameter range is small, and the structural stability of the support unit 100 is ensured.

Referring to FIG. 7 and FIG. 8, it may be understood that the cross-sectional profile of the through groove 114 is a circle, which makes the support unit 100 be simpler to machine and have better bearing effect, and the through grooves 114 may be uniformly distributed on the support unit 100, thereby realizing a better structural layout of the support unit 100. In the support unit 100 of this embodiment, an inner diameter of the through groove 114 ranges from 35 mm to 45 mm, and a distance between axes of adjacent through grooves 114 ranges from 40 mm to 60 mm. The above parameter ranges enable the support structures 130 on the support unit 100 to achieve better structural arrangement on the first plate 110 and the second plate 120, so that the support unit 100 can distribute the load to each support structure 130 when bearing, so as to reduce stress concentration, thus improving the bearing capability of the support unit 100. Furthermore, the support unit 100 is easier to machine and has higher yield.

Referring to FIG. 7 and FIG. 8, in some embodiments of the disclosure, the through groove 114 is formed by the first ring wall 111, and the cross-sectional profile of the through groove 114 is a circle. Therefore, both the first ring wall 111 and the second ring wall 121 have a circular columnar structure, which make the machining and assembly of the first plate 110 and the second plate 120 more convenient, reduce the difficulty of machining and assembly, and improve the production efficiency. Certainly, the cross-sectional profile of the through groove 114 may also be a triangle, a quadrilateral or a hexagon. That is, the cross sections of the first ring wall 111 and the second ring wall 121 are triangles, quadrilaterals, hexagons, and other structures, which is not specifically limited here. The support unit 100 with the above structure also has the advantages of high structural strength and strong bearing capacity.

Continuously referring to FIG. 7 and FIG. 8, in some embodiments of the disclosure, the first ring wall 111 is formed by stamping the first plate 110. The first ring wall 111 is formed by directly stamping the first plate 110, which can simplify the machining procedure and thus improve the production efficiency, and reduce the metal materials which can not only save the cost, but also reduce the weight of the support unit 100. In some embodiments of the disclosure, the second ring wall 121 is formed by stamping the second plate 120. The second ring wall 121 is formed by directly stamping the second plate 120, which can simplify the machining procedure and thus improve the production efficiency, and reduce the metal materials which can not only save the cost, but also reduce the weight of the support unit 100.

Referring to FIG. 3, in some embodiments of the disclosure, a lower end of the first ring wall 111 (i.e., the end far away from the first plate 110) extends outwards to form a first edge 112, and the first edge 112 may be formed by bending the first ring wall 111. The first edge 112 is attached to the second plate 120, and the first edge 112 is pressed against the second plate 120. The first edge 112 may be connected to the second plate 120 by pressing, welded to the second plate 120, or riveted to the second plate 120, and the specific connection mode is not specifically limited here. Therefore, the first ring wall 111 and the second ring wall 121 are more attached, the connection is more secure, and the structural strength of the support structure 130 is improved. Furthermore, the first edge 112 can support the second plate 120 and a joint between the second plate 120 and the second ring wall 121, so that the first ring wall 111 can more stably bear the load of the second plate 120, so that the bearing capacity of the support unit 100 is improved.

Continuously referring to FIG. 3, in some embodiments of the disclosure, the joint between the second plate 120 and the second ring wall 121 is provided with a second guide edge 123. The second guide edge 123 may be integrally machined with the second ring wall 121, which can optimize the stress concentration at the joint between the second plate 120 and the second ring wall 121. The second guide edge 123 is attached to the first edge 112, so that the second guide edge 123 and the first edge 112 can be connected more stably. The first edge 112 and the second guide edge 123, as well as the first ring wall 111 and the second ring wall 121 together form the support structure 130, which can further improve the structural strength and structural stability of the support structure 130, thereby further improving the bearing capacity of the support unit 100.

The second guide edge 123 is formed with a clamping groove 1231, and the first edge 112 is clamped in the clamping groove 1231, which can make the connection between the first edge 112 and the second guide edge 123 more stable. The clamping groove 1231 may be formed by pressing the first edge 112 to the second guide edge 123, thereby extruding the second guide edge 123. The machining of the clamping groove 1231 is simpler and more convenient, and the structure of the clamping groove 1231 is more stable. Certainly, the clamping groove 1231 may also be realized by other machining methods.

Continuously referring to FIG. 3, in some embodiments of the disclosure, a lowest position of the first edge 112 is located in a plane of the second plate 120, so that a lower end face of the support unit 100 is a relatively smooth surface, and the situation of hand cutting during personnel transportation or unstable center of gravity caused by interference with transportation equipment (such as forklift) is avoided. Moreover, the first edge 112 is flush with the second plate 120, so that the transportation equipment has larger contact area, more uniform stress and higher stability when the support unit 100 is supported.

Referring to FIG. 3, in some embodiments of the disclosure, a cavity 140 is formed between the first plate 110 and the second plate 120, and the support structure 130 formed by the first ring wall 111 and the second ring wall 121 is arranged in the cavity 140, which can be matched with the first plate 110 and the second plate 120 to support a shape of the cavity 140. In addition, the cavity 140 is formed with a sealed space by the support structure 130, to prevent foreign matters such as water from entering the cavity 140.

It should be noted that, in the embodiment of the disclosure, a depth of the cavity 140 ranges from 12 mm to 20 mm. Within the above range, the support structure 130 makes the support unit 100 have enough anti-compression strength, which can ensure that the cavity 140 is not deformed by extrusion, thus making the support unit 100 more durable.

Figure 4:
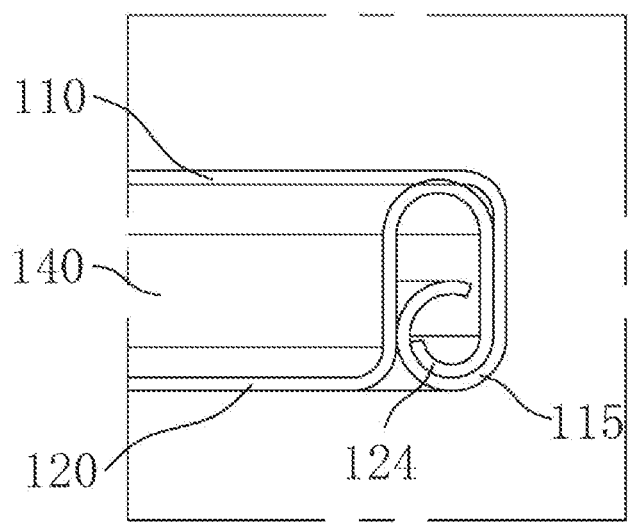
FIG. 4 is an enlarged view of portion B in FIG. 4.
Figure 5:
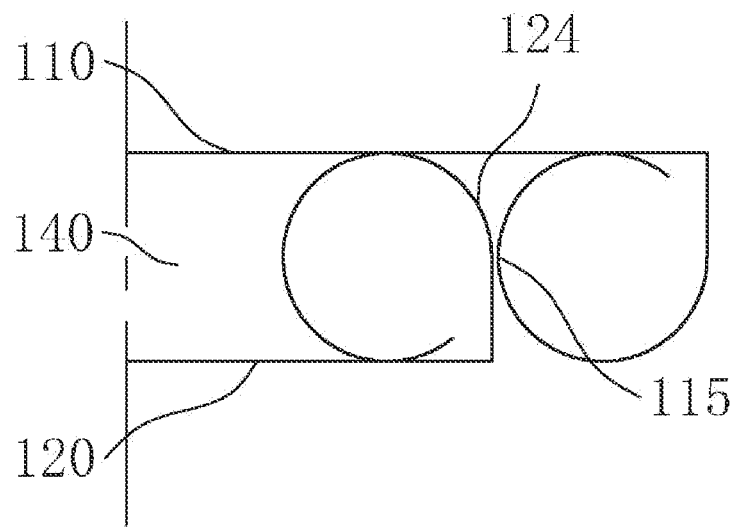
FIG. 5 is an enlarged view of another embodiment of FIG. 4.

Referring to FIG. 4 and FIG. 5, in some embodiments of the disclosure, a periphery of the first plate 110 is provided with a first folded edge 115, a periphery of the second plate 120 is provided with a second folded edge 124, and the first folded edge 115 is fixedly connected to the second folded edge 124. The matching structure of the first folded edge 115 and the second folded edge 124 can seal the edge of the support unit 100, and prevent foreign matters from entering the cavity 140 from the edge of the support unit 100 through a gap between the first plate 110 and the second plate 120, thus improving the stability of the support unit 100. It should be noted that structures of the first folded edge 115 and the second folded edge 124 may be commonly-used connecting structures on sheet metal parts, or folded edge structures fixed by fasteners such as bolts, or folded edge structures fixed by welding or riveting, which is not specifically limited here.

Referring to FIG. 1 to FIG. 9, a floor plate 1000 according to an embodiment of the disclosure includes the support unit 100 of the above embodiments. This embodiment of the disclosure adopts the support unit 100 of the embodiments according to the first aspect. The support unit 100 is provided with the first plate 110 and the second plate 120 arranged at intervals. The first plate 110 is provided with the plurality of first ring walls 111 that are correspondingly sleeved outside the plurality of second ring walls 121 provided on the second plate 120, and the first ring walls 111 and the second ring walls 121 are cooperatively connected, so that the first plate 110 and the second plate 120 are firmly connected, and the connection stability of the first plate 110 and the second plate 120 is improved. Each of the first ring walls 111 is connected with a respective one of the second ring walls 121 to form the support structure 130 that supports the first plate 110 and the second plate 120, and a plurality of the support structures 130 are arranged at intervals between the first plate 110 and the second plate 120, and can be combined with the first plate 110 and the second plate 120 to form the stable support unit 100, so that the floor plate 1000 has the advantages of high structural strength and strong bearing capacity. Cavities are formed between the first plate 110 and the second plate 120 and in the support structures 130, which can effectively reduce a weight of the floor plate 1000 while ensuring the structural strength of the floor plate 1000.

As the floor plate 1000 adopts all the technical solutions of the support unit 100 of the above embodiments, the floor plate 1000 has at least all the beneficial effects brought by the technical solutions of the above embodiments, and will not be described here again.

With reference to FIG. 6, in some embodiments of the disclosure, the support unit 100 forms the carrier 200, and the carrier 200 is formed by one or more support units 100. The carrier 200 is provided with a support leg 300 at a bottom thereof, and the support leg 300 supports the carrier 200 away from a bottom surface, so that it is convenient for transportation vehicles such as forklifts to transport the floor plate 1000. The support leg 300 may be made of metal, wood or plastic materials. It may be understood that the support leg 300 may either be fixedly connected to the first plate 110 or fixedly connected to the second plate 120.

Figure 9:
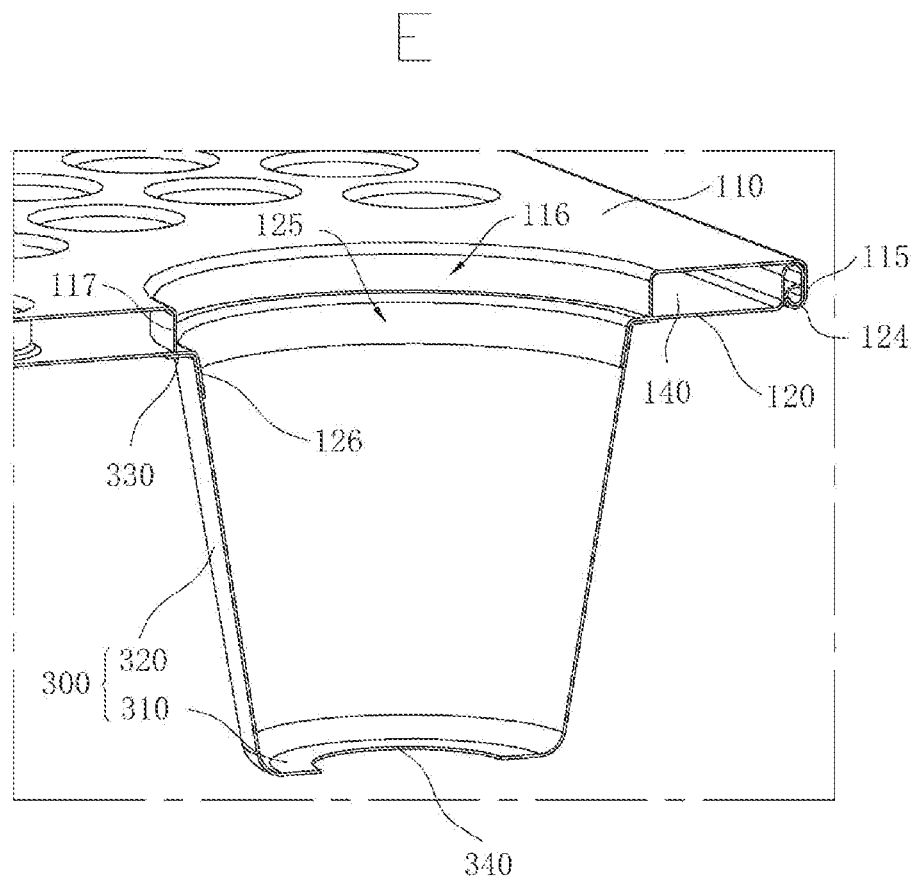
FIG. 9 is an enlarged view of portion E in FIG. 6.

Referring to FIG. 6 and FIG. 9, in some embodiments of the disclosure, the first plate 110 is provided with a third through hole 116 and a third ring wall 117, the third ring wall 117 is arranged at a periphery of the third through hole 116, and the third ring wall 117 may be formed by stamping. The third ring wall 117 extends towards the second plate 120 and abuts against the second plate 120, so that the first plate 110 is supported on the second plate 120 through the third ring wall 117, and the third ring wall 117 seals the cavity 140, thereby preventing foreign matters from entering the cavity 140.

Continuously referring to FIG. 9, the second plate 120 is provided with a fourth through hole 125 and a fourth ring wall 126, the fourth ring wall 126 is arranged at a periphery of the fourth through hole 125 and extends away from the first plate 110, and the fourth ring wall 126 may be formed by stamping. The third through hole 116 has a diameter smaller than a diameter of the fourth through hole 125, thus ensuring that the third ring wall 117 can be stably supported on the second plate 120.

Continuously referring to FIG. 9, the support leg 300 is a hollow structure with an open upper end, and the support leg 300 is sleeved on the fourth ring wall 126, which is more convenient to install and lighter in weight. The support leg 300 have a cone structure, and an outer diameter of the support leg 300 gradually decreases in a direction away from the carrier 200, and the third through hole 116 and the fourth through hole 125 are communicated with an upper end opening of the support leg 300, so that the support legs 300 of adjacent floor plates 1000 can be nested with each other when the floor plates 1000 are placed, thereby enabling the carriers 200 of adjacent floor plates 1000 to be stacked, thus greatly reducing the space required for storing the floor plates 1000.

Referring to FIG. 9, in some embodiments of the disclosure, the hollow support leg 300 includes a bottom wall 300 and a peripheral wall 320, and one end of the peripheral wall 320 is connected to the bottom wall 310, which makes the connection of the support leg 300 more stable and increases a friction force of a contact surface of the support leg 300. The other end of the peripheral wall 320 is connected to an outer side of the fourth ring wall 126, so that the connection between the support leg 300 and the carrier 200 is more reliable, and the connection reliability of the floor plate 1000 is improved.

It may be understood that, in some embodiments of the disclosure, one end of the peripheral wall 320 far away from the bottom wall 310 is provided with a mounting edge 330, and the mounting edge 330 abuts against the second plate 120, which further improves the connection stability between the support leg 300 and the second plate 120, and improves the installation efficiency between the support leg 300 and the second plate 120, thus making the structure of the floor plate 1000 more reliable.

Continuously referring to FIG. 9, the bottom wall 310 is provided with a fifth through hole 340, and the fifth through hole 340 is communicated with the third through hole 116, the fourth through hole 125 and the inner cavity of the support leg 300, so as to realize drainage between the first plate 110 and the contact surface of the support leg 300, and avoid water hiding in the support leg 300, thus prolonging the service life of the floor plate 1000.

Continuously referring to FIG. 9, in some embodiments of the disclosure, the support leg 300 is integrally manufactured, such as press molding or injection molding, which is more stable in structure, simpler to machine, lighter in weight, and convenient to install and replace.

Referring to FIG. 6, in some embodiments of the disclosure, a height between a bottom surface of the carrier 200 and a bottom surface of the support leg 300 is configured to allow the fork teeth of the forklift to be inserted, thereby facilitating the forklift to transport the floor plate 1000, improving the transportation efficiency, and improving the transportation safety.

An embodiment of the disclosure provides a shelf for storing goods. The shelf according to this embodiment includes a support plate for supporting goods, and the support plate includes the support unit 100 according to the above embodiments. The support plate of the embodiment of the disclosure adopts the support unit 100 of the embodiments according to the first aspect. The support unit 100 is provided with the first plate 110 and the second plate 120 arranged at intervals. The first plate 110 is provided with the plurality of first ring walls 111 that are correspondingly sleeved outside the plurality of second ring walls 121 provided on the second plate 120, and the first ring walls 111 and the second ring walls 121 are cooperatively connected, so that the first plate 110 and the second plate 120 are firmly connected, and the connection stability of the first plate 110 and the second plate 120 is improved. Each of the first ring wall 111 is connected with a respective one of the second ring walls 121 to form the support structure 130 that supports the first plate 110 and the second plate 120, and a plurality of the support structures 130 are arranged at intervals between the first plate 110 and the second plate 120, and can be combined with the first plate 110 and the second plate 120 to form the stable support unit 100, so that the support unit 100 has the advantages of high structural strength and strong bearing capacity. Cavities are formed between the first plate 110 and the second plate 120 and in the support structures 130, which can effectively reduce a weight of the support unit 100 while ensuring the structural strength of the support unit 100.

As the shelf adopts all the technical solutions of the support unit 100 of the above embodiments, the shelf has at least all the beneficial effects brought by the technical solutions of the above embodiments, and will not be described here again.

An embodiment of the disclosure provides a fence, and the fence is used for enclosing outer edges of areas such as construction sites and decoration units. The fence according to this embodiment includes a guardrail plate and a bracket, two ends of the guardrail plate are supported and positioned by the bracket, and the guardrail plate includes the support unit according to the above embodiments. The guardrail plate of the embodiment of the disclosure adopts the support unit 100 of the embodiment according to the first aspect. The support unit 100 is provided with the first plate 110 and the second plate 120 arranged at intervals. The first plate 110 is provided with the plurality of first ring walls 111 that are correspondingly sleeved outside the plurality of second ring walls 121 provided on the second plate 120, and the first ring walls 111 and the second ring walls 121 are cooperatively connected, so that the first plate 110 and the second plate 120 are firmly connected, and the connection stability of the first plate 110 and the second plate 120 is improved. Each of the first ring walls 111 is connected with a respective one of the second ring walls 121 to form the support structure 130 that supports the first plate 110 and the second plate 120, and a plurality of the support structures 130 are arranged at intervals between the first plate 110 and the second plate 120, and can be combined with the first plate 110 and the second plate 120 to form the stable support unit 100, so that the support unit 100 has the advantages of high structural strength and strong bearing capacity. Cavities are formed between the first plate 110 and the second plate 120 and in the support structures 130, which can effectively reduce a weight of the support unit 100 while ensuring the structural strength of the support unit 100.

As the fence adopts all the technical solutions of the support unit 100 of the above embodiments, the fence has at least all the beneficial effects brought by the technical solutions of the above embodiments, and will not be described here again.

Figure 10:
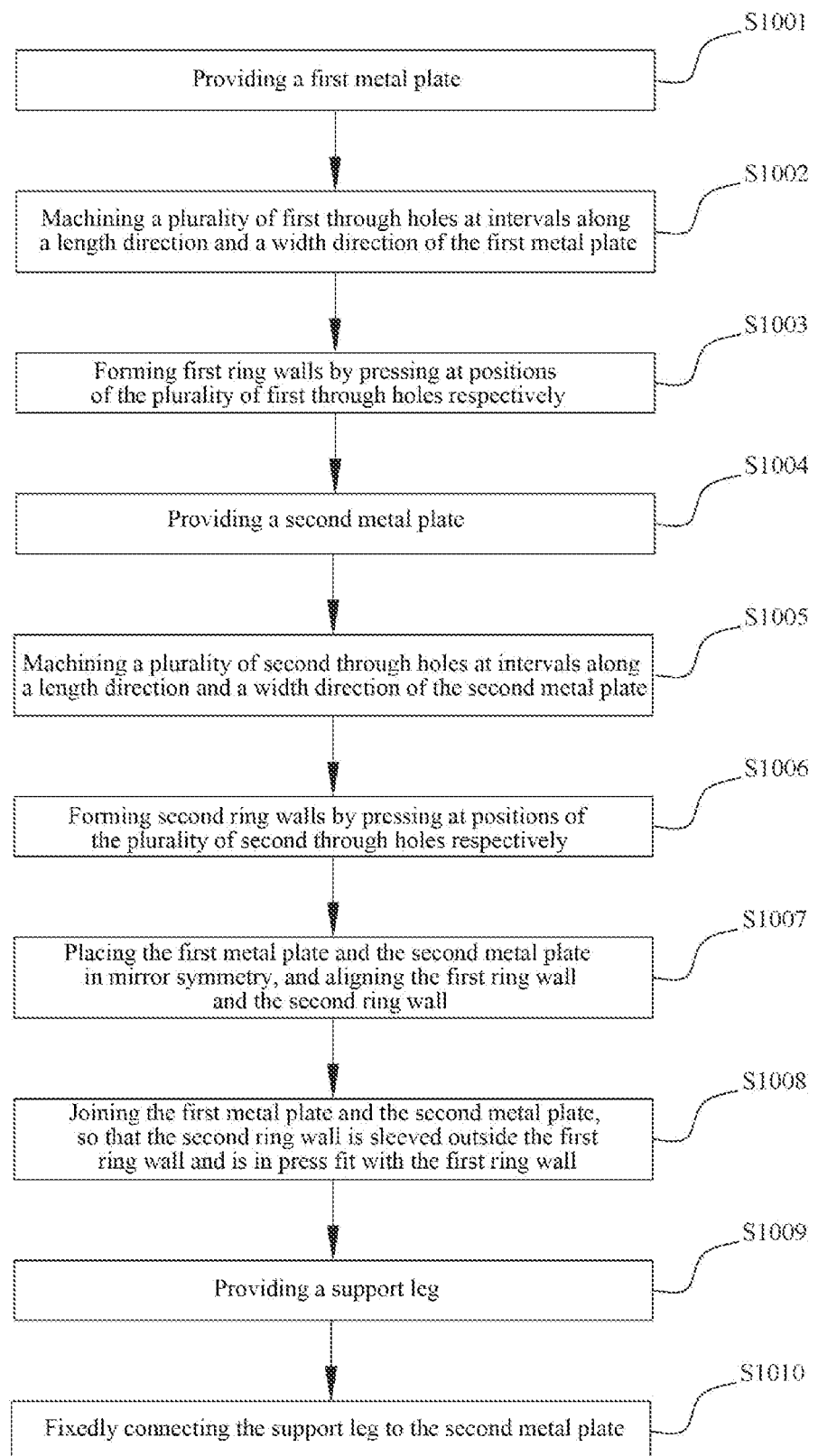
FIG. 10 is a flowchart of a method for manufacturing a floor plate according to an embodiment of the disclosure.

Referring to FIG. 10, a method for manufacturing a floor plate according to an embodiment of the disclosure is provided, which is used to produce a floor plate made of metal, wherein the floor plate made of metal has high structural strength and strong bearing capacity, can be recycled, saves energy, and protects the environment. The method for manufacturing the floor plate according to the embodiment of the disclosure includes the following steps.

In S1001, a first metal plate 1800 is provided. A size of the first metal plate 1800 is selected according to a size of a support surface of the floor plate. A thickness and a material of the first metal plate 1800 are selected according to the load-bearing requirements of the floor plate. It may be understood that the first metal plate 1800 of the embodiment of the disclosure adopts a sheet metal part, which has the advantages of high strength, light weight and convenient machining.

Figure 18:
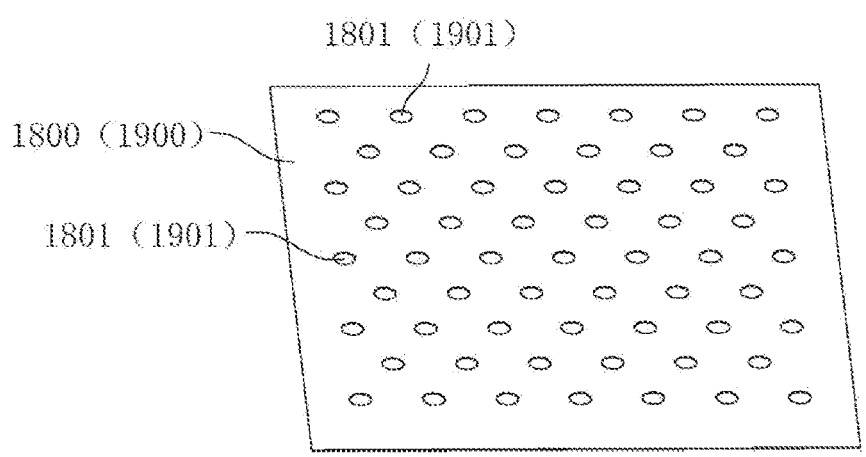
FIG. 18 is a schematic diagram of a step of punching a first plate or a second plate in a method for manufacturing a floor plate according to an embodiment of the disclosure.

In S1002, a plurality of first through holes 1801 are machined at intervals along a length direction and a width direction of the first metal plate 1800. Referring to FIG. 18, it may be understood that the plurality of first through holes 1801 are arranged in an array or uniformly distributed. The plurality of first through holes 1801 may be machined by punching. For example, the plurality of first through holes 1801 are arranged in a plurality of rows at intervals along the length direction of the first metal plate 1800, and in each row a plurality of first through holes 1801 are arranged at intervals along the width direction of the first metal plate 1800. Corresponding second through holes 1901 in two adjacent rows are arranged in a staggered manner.

Figure 19:
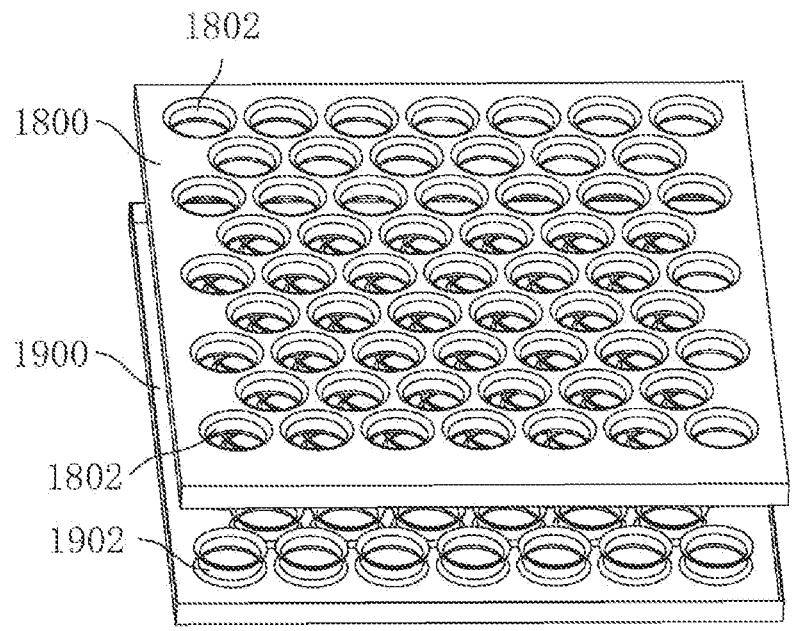
FIG. 19 is a schematic diagram of a step of aligning a first plate and a second plate in a method for manufacturing a floor plate according to an embodiment of the disclosure.

In S1003, first ring walls 1802 are formed by pressing at positions of the plurality of first through holes 1801 respectively. Referring to FIG. 18 and FIG. 19, it may be understood that the first ring wall 1802 may be machined from the first metal plate 1800 by stamping. The first ring wall 1802 is formed on a periphery of the first through hole 1801, and the first ring wall 1802 may extend in a direction perpendicular to the first metal plate 1800 or in a direction towards a second metal plate 1900, forming a hollow cylindrical structure. It may be understood that after the first ring wall 1802 is formed by pressing, an aperture formed by the first through hole 1801 is larger than an aperture of the first through hole 1801 machined in step S1002, and an inner hole formed by the first ring wall 1802 is beneficial for drainage of the first metal plate 1800, and also increases the overall strength of the first metal plate 1800.

In S1004, a second metal plate 1900 is provided. A size of the second metal plate 1900 is selected according to the size of the support surface of the floor plate. A thickness and a material of the second metal plate 1900 are selected according to the load-bearing requirements of the floor plate. In order to improve the production efficiency, the size of the second metal plate 1900 is substantially the same as the size of the first metal plate 1800. Certainly, parameters of the second metal plate 1900 (e.g., size, thickness or material) may also be different from those of the first metal plate 1800, and may be specifically designed according to use requirements. It may be understood that the second metal plate 1900 of the embodiment of the disclosure adopts a sheet metal part, which has the advantages of high strength, light weight and convenient machining.

In S1005, a plurality of second through holes 1901 are machined at intervals along a length direction and a width direction of the second metal plate 1900. Referring to FIG. 18, it may be understood that the plurality of second through holes 1901 are arranged in an array or uniformly distributed. The arrangement of the second through holes 1901 is the same as that of the first through holes 1801. The plurality of second through holes 1901 may be machined by punching. For example, the plurality of second through holes 1901 are arranged in a plurality of rows at intervals along the length direction of the second metal plate 1900, and in each row a plurality of second through holes 1901 are arranged at intervals along the width direction of the second metal plate 1900. Corresponding second through holes 1901 in two adjacent rows are arranged in a staggered manner.

In S1006, second ring walls 1902 are formed by pressing at positions of the plurality of second through holes 1901 respectively. Referring to FIG. 18 and FIG. 19, it may be understood that the second ring wall 1902 may be machined from the second metal plate 1900 by stamping. The second ring wall 1902 is formed on a periphery of the second through hole 1901, and the second ring wall 1902 may extend in a direction perpendicular to the second metal plate 1900 or in a direction towards the first metal plate 1800, forming a hollow-like cylindrical structure. It may be understood that after the second ring wall 1902 is formed by pressing, an aperture formed by the second ring wall 1902 is larger than an aperture of the second through hole 1901 machined in step S1005, and an inner hole formed by the second ring wall 1902 is beneficial for drainage of the second metal plate 1900, and also increases the overall strength of the second metal plate 1900.

Figure 20:
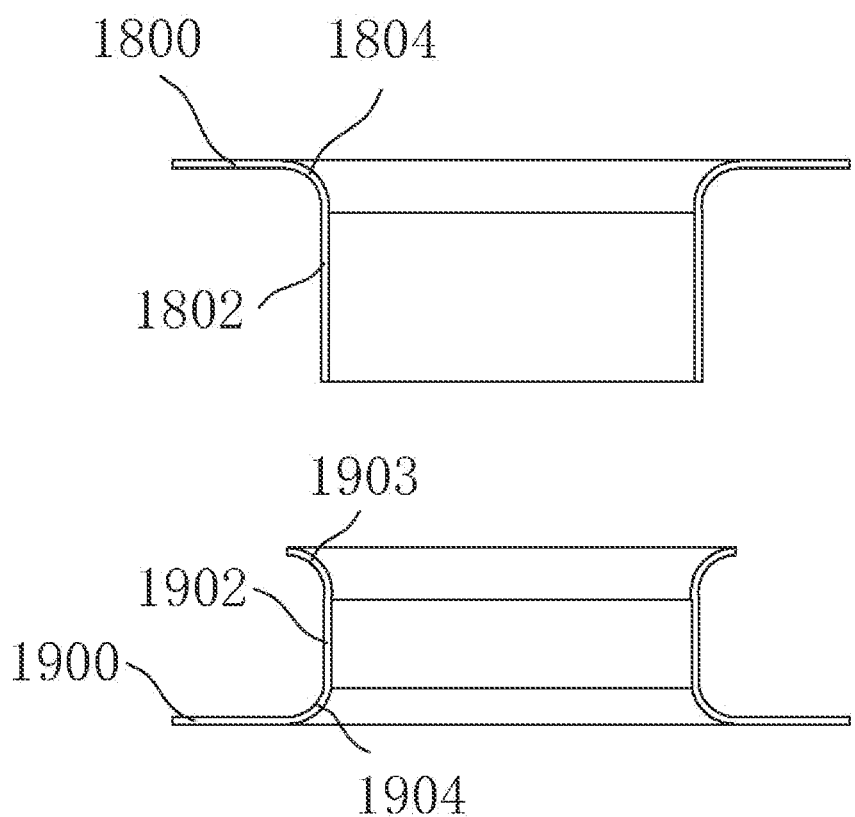
FIG. 20 is a partial sectional view of FIG. 19.

In S1007, the first metal plate 1800 and the second metal plate 1900 are placed in mirror symmetry, and the first ring walls 1802 and the second ring walls 1902 are aligned respectively. Referring to FIG. 19 and FIG. 20, it may be understood that the second metal plate 1900 machined with the second ring walls 1902 may be turned up and down to form mirror symmetry with the first metal plate 1800, and the second ring walls 1902 on the second metal plate 1900 are aligned with the first ring walls 1802 on the first metal plate 1800 one by one, which improves the matching installation accuracy of the first metal plate 1800 and the second metal plate 1900 and reduces the difficulty of production and machining.

It should be noted that the machining steps of the first metal plate 1800 and the second metal plate 1900 may be interchanged, which is not specifically limited here.

Figure 21:
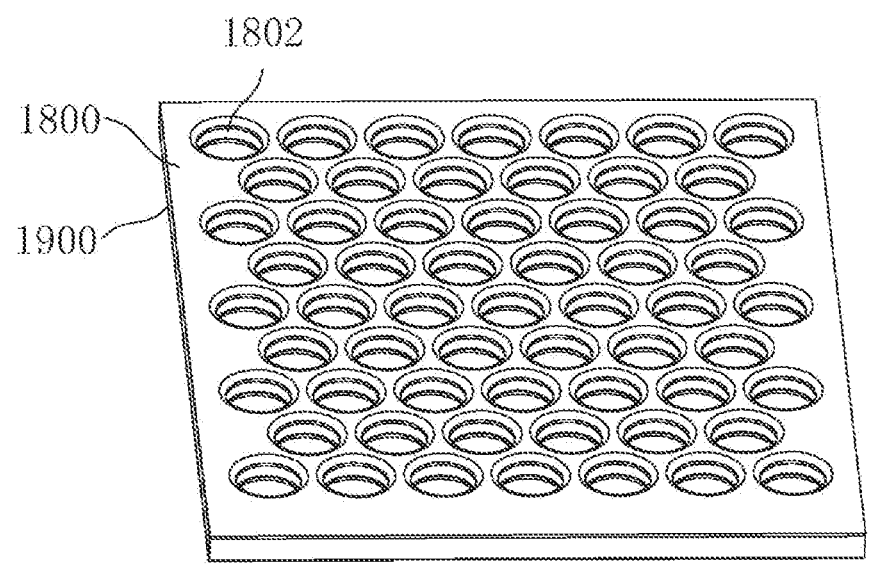
FIG. 21 is a schematic diagram of a step of jointing a first plate and a second plate in a method for manufacturing a floor plate according to an embodiment of the disclosure.
Figure 22:
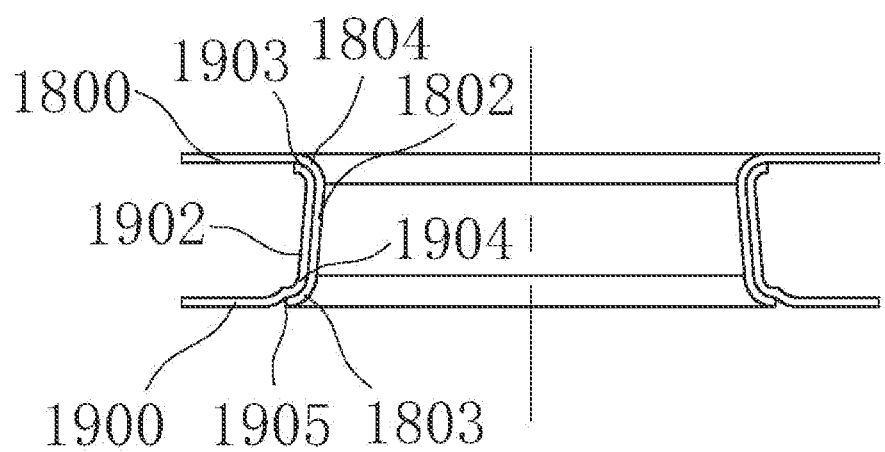
FIG. 22 is a partial sectional view of FIG. 21.

In S1008, the first metal plate 1800 and the second metal plate 1900 are jointed, so that the second ring walls 1902 are sleeved outside and in press fit with the first ring walls 1802 respectively. Referring to FIG. 21 and FIG. 22, it may be understood that press fit connection of the first ring wall 1802 and the second ring wall 1902 may be understood as a connection mode in which no relative movement occurs between the first ring wall 111 and the second ring wall 121. The first ring wall 111 and the second ring wall 121 may be connected in interference fit or transition fit, and may also be completely or partially attached. The first ring wall 1802 and the second ring wall 1902 are in press fit, so that the first metal plate 1800 and the second metal plate 1900 may be stably connected, and the overall stability of the floor plate is improved. Moreover, the first ring wall 1802 and the second ring wall 1902 are connected to form a support structure, which may be a hollow cylindrical structure and can support the first metal plate 1800 and the second metal plate 1900, so that the first metal plate 1800 and the second metal plate 1900 are joined to form a stable support surface of the floor plate, and the structural strength of the floor plate is improved. The support structure adopts a structure that the second ring wall 1902 is sleeved outside the first ring wall 1802, which can form a double-layer structure, thus improving the strength of the support structure and further improving the bearing capacity of the floor plate.

In S1009, a support leg is provided. It may be understood that the support leg is generally made of metal material. Moreover, in order to reduce the overall weight of the floor plate and facilitate the handling of personnel, the support leg is generally made of sheet metal part. For example, the support leg may be a stamped part, i.e., machined into a hollow structure, so as to meet the structural strength requirements and effectively reduce the weight. In addition, the support leg may also be made of lightweight material with certain strength, such as plastic material or wood.

In S1010, the support leg is fixedly connected to the second metal plate 1900. It may be understood that a plurality of support legs are provided, and the specific number of support legs is designed according to the load-bearing requirements of the floor plate and the load-bearing capacity of a single support leg. For example, nine support legs are provided, wherein eight are arranged at intervals along a periphery of the support surface of the floor plate, and the remaining one is located at a center of the support surface of the floor plate.

According to the method for manufacturing the floor plate of the embodiment of the disclosure, by machining the first ring walls 1802 from the first plate 1800 and machining the second ring walls 1902 from the second plate 1900, and jointing the first plate 1800 and the second plate 1900 in mirror symmetry, the second ring walls 1902 are sleeved outside the first ring walls 1802 and tightly matched with the first ring walls 1802 respectively, the machining of the metal floor plate is realized. The method has simple machining procedure, and reduces the production cost. Meanwhile, the produced floor plate has high structural strength, strong bearing capacity and long service life.

Figure 11:
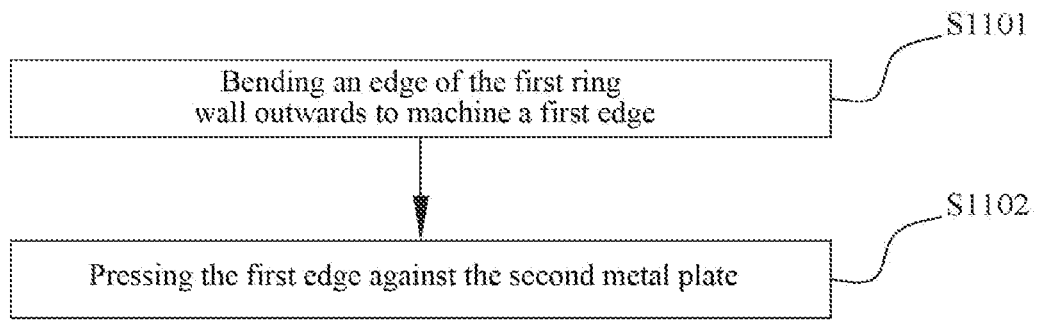
FIG. 11 is a flowchart of a method for manufacturing a floor plate according to another embodiment of the disclosure.

Referring to FIG. 11, it may be understood that after step S1008, the method further includes the following steps.

In S1101, an edge of the first ring wall 1802 is bent outwards to machine a first edge 1803. The first edge 1803 is formed at one end of the first ring wall 1802 far away from the first metal plate 1800. The first edge 1803 can support the second ring wall 1902 or the second metal plate 1900, thereby improving the supporting effect of the first metal plate 1800 and the second metal plate 1900. The first edge 1803 can limit a degree of freedom of the second ring wall 1902 in an axial direction, and prevent the first metal plate 1800 from separating from the second metal plate 1900, thus further improving the connection stability between the first metal plate 1800 and the second metal plate 1900, and further enhancing the structural strength of the floor plate.

In S1102, the first edge 1803 is pressed against the second metal plate 1900. The first edge 1803 may be connected to the second plate 120 by pressing, or welded to the second metal plate 1900, or riveted to the second metal plate 1900, and the specific connection mode is not specifically limited here. The first edge 1803 can make the connection between the first metal plate 1800 and the second metal plate 1900 more stable, and make the overall structure of the floor plate more stable.

Figure 12:
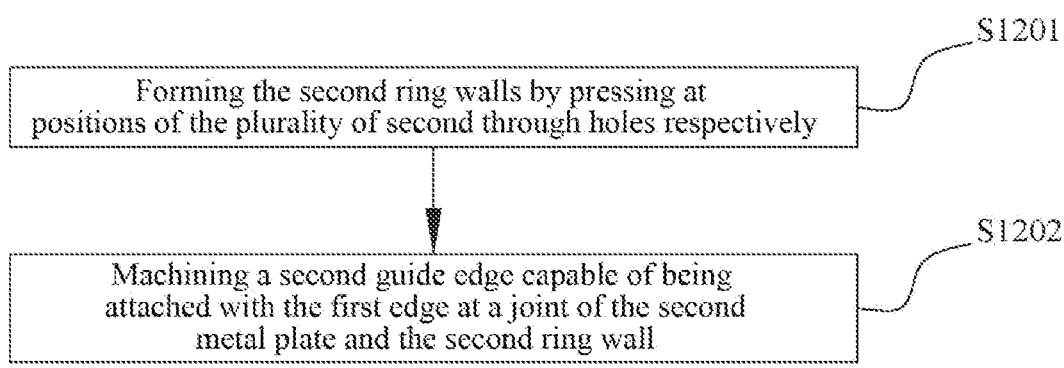
FIG. 12 is a flowchart of a method for manufacturing a floor plate according to another embodiment of the disclosure.

Referring to FIG. 12, it may be understood that the step S1006 specifically includes the following steps.

In S1201, a plurality of second ring walls 1902 are formed by pressing at positions of the plurality of second through holes 1901 respectively. Each of the second ring walls 1902 is formed by pressing at a periphery of a respective one of the second through holes 1901. An inner hole formed by the second ring wall 1902 is beneficial to the drainage of the second metal plate 1900, and also increases the overall strength of the second metal plate 1900 and improves the bending resistance of the second metal plate 1900.

In S1202, a second guide edge 1904 capable of being attached with the first edge 1803 at a joint of the second metal plate 1900 and the second ring wall 1902 is machined. It may be understood that the second guide edge 1904 and the second ring wall 1902 may be machined by one step, or by multiple steps. The second guide edge 1904 is attached to the first edge 1803, which makes the connection between the second ring wall 1902 and the first ring wall 1802 more secure, thus making the floor plate more evenly stressed and having a better bearing effect. Moreover, the first edge 1803 can better support the second ring wall 1902 and improve the structural strength of the floor plate. Moreover, the first edge 1803 can limit the degree of freedom of the second ring wall 1902 in the axial direction, and prevent the first metal plate 1800 from separating from the second metal plate 1900, thus further improving the connection stability between the first metal plate 1800 and the second metal plate 1900, and further enhancing the structural strength of the floor plate.

Figure 13:
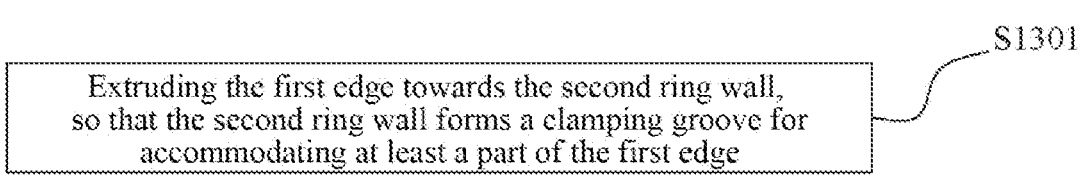
FIG. 13 is a flowchart of a method for manufacturing a floor plate according to another embodiment of the disclosure.

Referring to FIG. 13, it may be understood that the step S1102 specifically includes the following steps.

In S1301, the first edge 1803 is extruded towards the second ring wall 1902, so that the second ring wall 1902 forms a clamping groove 1905 for accommodating at least a part of the first edge 1803. It may be understood that the first edge 1803 is clamped with the clamping groove 1905, so that the connection between the first edge 1803 and the second ring wall 1902 is more stable and reliable. Furthermore, the first edge 1803 is stably connected to the second ring wall 1902, so that the first ring wall 1802 and the second ring wall 1902 form a stable support structure, so that the overall structure of the floor plate is more stable and the bearing capacity is stronger.

It should be noted that when the second guide edge 1904 which can be attached to the first edge 1803 is machined at a joint between the second ring wall 1902 and the second metal plate 1900, the clamping groove 1905 is formed at the second guide edge 1904. Therefore, the first edge 1803 can be better connected to the second guide edge 1904, and the connection stability between the first metal plate 1800 and the second metal plate 1900 is improved. Furthermore, the first edge 1803 can be flush with a surface of the second metal plate 1900, which improves the stability of the floor plate during forklift transportation and the use safety during personnel transportation, and reduces the safety risk of the floor plate during use.

Figure 14:
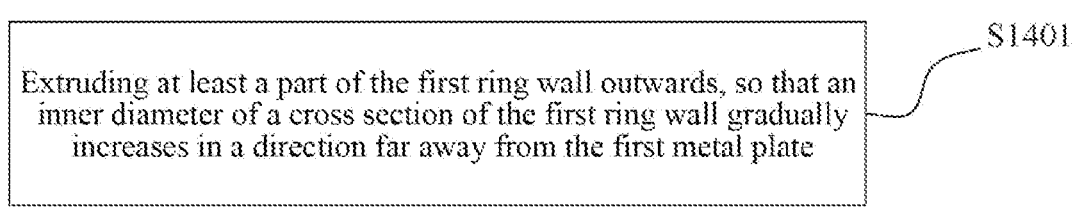
FIG. 14 is a flowchart of a method for manufacturing a floor plate according to another embodiment of the disclosure.

Referring to FIG. 14, it may be understood that after step S1008, the method further includes the following step.

In S1401, at least a part of the first ring wall 1802 is extruded outwards, so that an inner diameter of a cross section of the first ring wall 1802 gradually increases in a direction far away from the first metal plate 1800. It may be understood that the first ring wall 1802 may be extruded outwards by expanding or reaming, which is not specifically limited here. For example, the whole first ring wall 1802 may be extruded, or an end of the first ring wall 1802 far away from the first metal plate 1800 may be extruded. After the first ring wall 1802 is extruded, a longitudinal section of the first ring wall 1802 is inclined relative to an axis of the first ring wall 1802, and the inclined angle may be designed in a range from 1 degree to 3 degrees. Here, the longitudinal section of the first ring wall 1802 may be understood as a section formed by cutting the first ring wall 1802 with a plane where the axis of the first ring wall 1802 locates. Therefore, by extruding the first ring wall 1802, the connection between the first ring wall 1802 and the second ring wall 1902 can be firmer, and the first ring wall 1802 and the second ring wall 1902 form a tapered structure, which can prevent the second metal plate 1900 from falling off the first metal plate 1800, thus further improving the structural stability of the floor plate, and making the floor plate have higher structural strength and stronger bearing capacity.

Figure 15:
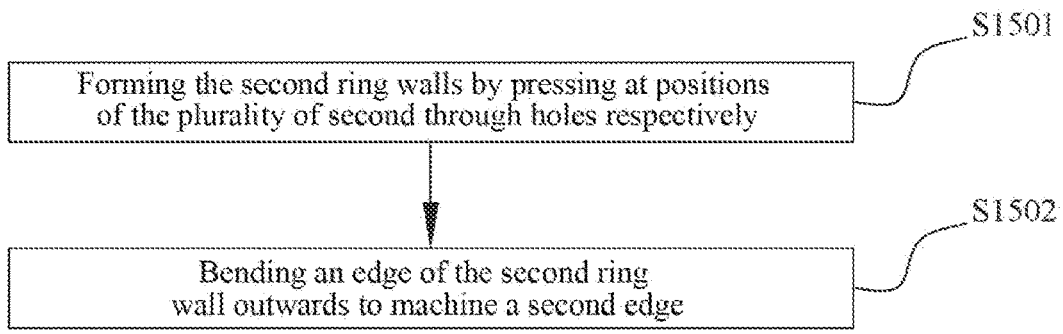
FIG. 15 is a flowchart of a method for manufacturing a floor plate according to another embodiment of the disclosure.

Referring to FIG. 15, it may be understood that the step S1006 specifically includes the following steps.

In S1501, the second ring walls 1902 are formed by pressing at positions of the plurality of second through holes 1901 respectively. Each of the second ring walls 1902 is formed by pressing at a periphery of a respective one of the second through holes 1901. The inner hole formed by the second ring wall 1902 is beneficial to the drainage of the second metal plate 1900, and also increases the overall strength of the second metal plate 1900 and improves the bending resistance of the second metal plate 1900.

In S1502, an edge of the second ring wall 1902 is bent outwards to machine a second edge 1903. The second edge 1903 is formed at one end of second ring wall 1902 far away from the second metal plate 1900. The second edge 1903 and the second ring wall 1902 may be machined by one step, or by multiple steps. The second edge 1903 can support the first ring wall 1802 or the first metal plate 1800, thereby improving the supporting effect of the first metal plate 1800 and the second metal plate 1900. In addition, the second edge 1903 may be formed as an arc-shaped chamfer, so that the second edge 1903 can play a role of guiding the first ring wall 1802 to be internally sleeved to the second ring wall 1902 when the first metal plate 1800 and the second metal plate 1900 are joined, so that the first metal plate 1800 and the second metal plate 1900 are joined more smoothly to improve the assembly efficiency.

Figure 16:
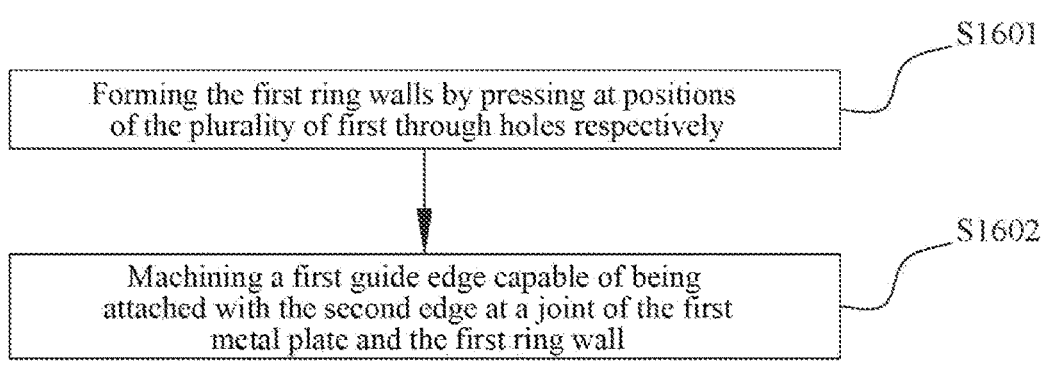
FIG. 16 is a flowchart of a method for manufacturing a floor plate according to another embodiment of the disclosure.

Referring to FIG. 16, it may be understood that the step S1003 specifically includes the following steps.

In S1601, the first ring walls 1802 are formed by pressing at positions of the plurality of first through holes 1801 respectively. Each of the first ring walls 1802 is formed by pressing at a periphery of a respective one of the first through holes 1801.

In S1602, a first guide edge 1804 capable of being attached with the second edge 1903 is machined at a joint of the first metal plate 1800 and the first ring wall 1802. It may be understood that the first guide edge 1804 and the first ring wall 1802 may be machined by one step, or by multiple steps. The first guide edge 1804 is attached to the second edge 1903, which makes the connection between the first ring wall 1802 and the second ring wall 1902 more secure, thus making the floor plate more evenly stressed and having a better bearing effect. Moreover, the second edge 1903 can better support the first ring wall 1802 and improve the structural strength of the floor plate.

Figure 17:
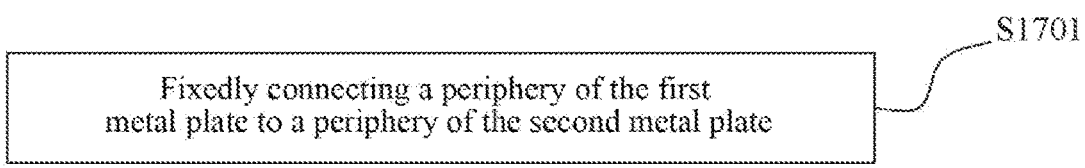
FIG. 17 is a flowchart of a method for manufacturing a floor plate according to another embodiment of the disclosure.

Referring to FIG. 17, it may be understood that after step S1008, the method further includes the following step.

In S1701, a periphery of the first metal plate 1800 is fixedly connected to a periphery of the second metal plate 1900. It may be understood that the periphery of the first metal plate 1800 and the periphery of the second metal plate 1900 may be respectively machined into mutually matched folded edges to realize stable connection, and the connection may also be realized by fasteners such as bolts, which are not specifically limited here. The periphery of the first metal plate 1800 and the periphery of the second metal plate 1900 are fixedly connected, which can prevent rainwater or foreign matters from entering a space between the first metal plate 1800 and the second metal plate 1900 during use to damage the floor plate by corrosion. For example, when the connection between the first metal plate 1800 and the second metal plate 1900 is realized by using mutually matched folded edges, the folded edges may be machined before the step of joining the first metal plate 1800 and the second metal plate 1900, so that the periphery of the first metal plate 1800 and the periphery of the second metal plate 1900 may be connected during the process of connecting the first ring wall 1802 with the second ring wall 1902. The step of connecting the periphery of the first metal plate 1800 with the periphery of the second metal plate 1900 may also be designed before or after the step of connecting the first ring wall 1802 with the second ring wall 1902, which is not specifically limited here.

Referring to FIG. 18, it may be understood that both the first ring wall 1802 and the second ring wall 1902 are formed by stamping, and the stamping process is mature, with high machining accuracy and high quality, which makes the structures of the first ring wall 1802 and the second ring wall 1902 stable, ensures the structural strength of the floor plate and improves the product quality.

Referring to FIG. 19, it may be understood that both the first through hole 1801 and the second through hole 1901 are formed by punching. The punching process is simple and mature, with high machining quality, high machining accuracy and high machining safety and reliability.

Referring to FIG. 18 and FIG. 19, it may be understood that both the first through hole 1801 and the second through hole 1901 are circular holes, which is more convenient to machine. Furthermore, cross-sectional profiles of the first ring wall 1802 and the second ring wall 1902 machined from the circular holes are circular, which makes the structures of the first ring wall 1802 and the second ring wall 1902 more stable, facilitates the joint molding of the first metal plate 1800 and the second metal plate 1900, and reduces the machining difficulty. Certainly, the first through hole 1801 and the second through hole 1901 may also be designed in triangles, quadrilaterals, hexagons and other structures, which are not specifically limited here. In addition, the above design is convenient to machine the first edge 1803, the first guide edge 1804 and other structures from the first ring wall 1802 and is also convenient to machine the second edge 1903, the second guide edge 1904 and other structures from the second ring wall 1902.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

The invention claimed is:

1. A support unit, comprising:
a first plate, wherein one end of the first plate is provided with a plurality of first ring walls spaced apart from one another; and
a second plate spaced apart from the first plate, wherein one end of the second plate facing the first plate is provided with a plurality of second ring walls spaced apart from one another, the plurality of second ring walls extend towards the first plate and are arranged corresponding to the plurality of first ring walls, the first plate is jointed with the second plate, so that each of the second ring walls is sleeved outside a respective one of the first ring walls and is in press fit with the first ring wall to form a support structure, and the support structure is used for supporting the first plate and the second plate.

2. The support unit of claim 1, wherein each of the first ring walls is formed by deforming the first plate towards the second plate, and one end of the first ring wall far away from the first plate extends across the second plate.

3. The support unit of claim 2, wherein an inner diameter of a cross section of at least a part of the first ring wall gradually increases in a direction far away from the first plate.

4. The support unit of claim 2, wherein a longitudinal section of the first ring wall is inclined relative to an axis of the first ring wall by an angle ranging from 1 degree to 3 degrees.

5. The support unit of claim 2, wherein the first ring wall forms a through groove with a cross-sectional profile of a circle, a triangle, a quadrilateral or a hexagon.

6. The support unit of claim 5, wherein the cross-sectional profile of the through groove is a circle, an inner diameter of the through groove ranges from 35 mm to 45 mm, and a distance between axes of adjacent through grooves ranges from 40 mm to 60 mm.

7. The support unit of claim 2, wherein one end of the first ring wall far away from the first plate extends outwards to form a first edge, and the first edge is attached to the second plate.

8. The support unit of claim 7, wherein a second guide edge is provided at a joint between the second plate and the second ring wall, the second guide edge is formed with a clamping groove, and the first edge is clamped in the clamping groove.

9. The support unit of claim 8, wherein a lowest position of the first edge is located in a plane of the second plate.

10. The support unit of claim 1, wherein the first plate is made of metal, and the first ring walls are formed by stamping the first plate; and the second plate is made of metal, and the second ring walls are formed by stamping the second plate.

11. The support unit of claim 1, wherein one end of the second ring wall far away from the second plate extends outwards to form a second edge, and the second edge is attached to the first plate.

12. The support unit of claim 11, wherein a first guide edge is provided at a joint between the first plate and the first ring wall, and the second edge is attached to the first guide edge.

13. The support unit of claim 12, wherein a longitudinal section of the first guide edge is an arc, and a longitudinal section of the second edge is an arc matched with the first guide edge.

14. The support unit of claim 1, wherein a cavity is formed between the first plate and the second plate, and a depth of the cavity ranges from 12 mm to 20 mm.

15. A floor plate, comprising the support unit of claim 1.

16. The floor plate of claim 15, wherein the support unit forms a carrier with a support leg at a bottom of the carrier; the first plate is provided with a third through hole and a third ring wall, the third ring wall is arranged at a periphery of the third through hole, the third ring wall extends towards the second plate and abuts against the second plate; the second plate is provided with a fourth through hole and a fourth ring wall, and the fourth ring wall is arranged at a periphery of the fourth through hole and extends in a direction far away from the first plate; and the support leg is a hollow cone structure with an open upper end, the support leg is sleeved on the fourth ring wall, and an outer diameter of the support leg gradually decreases in a direction far away from the carrier;

wherein, the third through hole has a diameter smaller than a diameter of the fourth through hole.

17. A method for manufacturing a floor plate, comprising:

providing a first plate;

machining a plurality of first through holes which are spaced apart from one another along a length direction and a width direction of the first plate;

forming a plurality of hollow cylindrical first ring walls by pressing at positions of the plurality of first through holes respectively;

providing a second plate;

machining a plurality of second through holes which are spaced apart from one another along a length direction and a width direction of the second plate;

forming a plurality of hollow cylindrical second ring walls by pressing at positions of the plurality of second through holes respectively;

placing the first plate and the second plate in mirror symmetry, and aligning each of the first ring walls with a respective one of the second ring walls;

joining the first plate and the second plate, so that each of the second ring walls is sleeved outside a respective one of the first ring walls and is in press fit with the first ring wall;

providing a support leg; and fixedly connecting the support leg to the second plate.

18. The method for manufacturing the floor plate of claim 17, wherein after the step of joining the first plate and the second plate, so that each of the second ring walls is sleeved outside a respective one of the first ring walls and is in press fit with the first ring wall, the method further comprises:

extruding at least a part of the first ring wall outwards, so that an inner diameter of a cross section of the first ring wall gradually increases in a direction far away from the first plate.

\* \* \* \* \*